Figure 1:
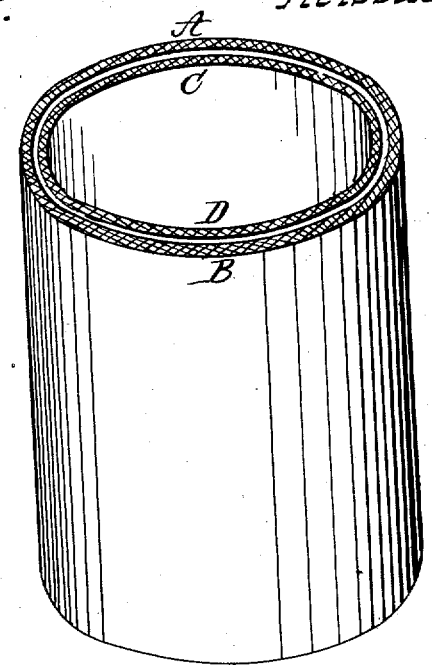
Figure 3:
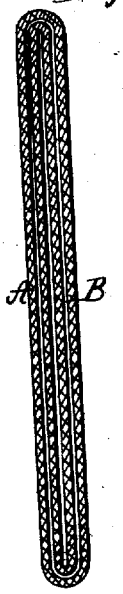
Figure 2:
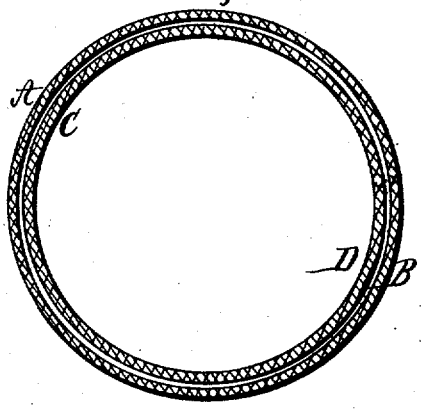

Cooley & Cook.
Woven Fabric.

No. 595. Reissued Aug. 31, 1858.

Inventor,

Linus B. Cooley
Ira C. Cooke

Witnesses,

Jonathan Barnes
Maria W. Barnes

UNITED STATES PATENT OFFICE.

L. B. COOLEY, S. BABCOCK, AND B. G. COOLEY, OF MIDDLETOWN, CONNECTICUT, ASSIGNEES OF L. B. COOLEY AND JAS. C. COOKE.

IMPROVEMENT IN THE MANUFACTURE OF TEXTILE HOSE.

Specification forming part of Letters Patent No. 19,625, dated March 16, 1858; Reissue No. 595, dated August 31, 1858.

*To all whom it may concern:*

Be it known that we, LINUS B. COOLEY, SAMUEL BABCOCK, and BENJAMIN G. COOLEY, all of Middletown, in the county of Middlesex and State of Connecticut, being, by assignment, sole owners of a new and useful mode of manufacturing from textile materials hose or cylindrical pipes for hydraulic and other purposes, and belting for machinery, invented by the said LINUS B. COOLEY and JAMES C. COOKE, do hereby certify that the following is an exact description of the same, reference being had to the annexed drawings as a part of this specification.

Figure I represents a perspective view of the hose; Fig. II, an end view; Fig. III, an end view of the united double hose flattened for belting.

We mount a loom with a suitable number of harnesses to weave, as it were, four pieces of plain cloth. Then by springing the warp-shades and throwing in the woof successively in A and B we get a single plain hose or pipe. When this is done, after throwing in a suitable number of woof-threads in A and B, we spring the warp-shades of C and D and cross the woof from A and B to C and D, and through them successively a suitable number of times, thus forming a second single hose or pipe within the one already woven. Then we spring the warp-shades for A and B again and cross the woof to and through them, as before. The crossing of the woof from one hose or pipe to the other, unites the two, and, as every practical weaver knows, the crossing may be either on one selvage or both, or in any place or places which may be deemed best or most desirable; and by this means we unite the two hose or pipes in one or more places throughout their entire length, making a complete double hose or cylindrical pipe; and it is apparent that by making the hose double greater strength is obtained, and that by uniting the same throughout their length both will be kept equally straight and even.

What we claim as our invention, and desire to secure by Letters Patent, is—

The double tube or hose as a new article of manufacture, woven in the manner and for the purposes specified, and this we claim whether our new manufacture be used for hose, belting, card-clothing, shoe-soles, harness-pads, and traces, or any other purpose.

Dated at Middletown the 19th day of July, A. D. 1858.

LINUS B. COOLEY.
SAMUEL BABCOCK.
BENJ. G. COOLEY.

In presence of—
MARIA W. BARNES,
JONATHAN BARNES.